United States Patent
Burcher et al.

(10) Patent No.: US 12,492,122 B2
(45) Date of Patent: Dec. 9, 2025

(54) PROCESS FOR PRODUCING AND REGENERATING HYDROGEN CARRIER COMPOUNDS

(71) Applicant: HYSILABS, SAS, Aix-en-Provence (FR)

(72) Inventors: Benjamin Burcher, Saint-Jorioz (FR); Vincent Lome, Chateaurenard (FR); Remy Benoit, Villeneuves-les-Avignon (FR)

(73) Assignee: HYSILABS, SAS (FR)

( * ) Notice: Subject to any disclaimer, the term of this patent is extended or adjusted under 35 U.S.C. 154(b) by 1430 days.

(21) Appl. No.: 15/733,712

(22) PCT Filed: Apr. 30, 2019

(86) PCT No.: PCT/EP2019/061109
§ 371 (c)(1),
(2) Date: Oct. 1, 2020

(87) PCT Pub. No.: WO2019/211301
PCT Pub. Date: Nov. 7, 2019

(65) Prior Publication Data
US 2021/0017021 A1    Jan. 21, 2021

(30) Foreign Application Priority Data

May 2, 2018 (EP) .................. 18305549
Jul. 23, 2018 (EP) .................. 18306001

(51) Int. Cl.
C08G 77/06 (2006.01)
C01B 3/00 (2006.01)
C01B 3/06 (2006.01)
C08G 77/12 (2006.01)
C08L 83/04 (2006.01)

(52) U.S. Cl.
CPC .............. *C01B 3/06* (2013.01); *C01B 3/0015* (2013.01); *C08G 77/06* (2013.01); *C08G 77/12* (2013.01); *C08L 83/04* (2013.01); *C01B 2203/0255* (2013.01); *C08L 2205/025* (2013.01)

(58) Field of Classification Search
CPC .......... C08G 77/06; C08G 77/12; C08L 83/04; Y02E 60/32
See application file for complete search history.

(56) References Cited

U.S. PATENT DOCUMENTS

2010/0290972 A1*  11/2010  Cicero ................... C01B 33/03
                                                                423/349
2022/0388840 A1*  12/2022  Burcher ................ C01B 3/0015

FOREIGN PATENT DOCUMENTS

| | | | |
|---|---|---|---|
| EP | 0107432 A2 * | 5/1984 | ....... C01B 33/10742 |
| EP | 2206679 | 7/2010 | |
| JP | 2002134141 | 5/2002 | |
| JP | 2009091208 | 4/2009 | |
| WO | 2009080986 | 7/2009 | |
| WO | 2010070001 | 6/2010 | |
| WO | 2010094785 | 8/2010 | |
| WO | 2011098614 | 8/2011 | |
| WO | 2011141287 | 11/2011 | |
| WO | 2013109918 | 7/2013 | |
| WO | 2014082801 | 10/2013 | |
| WO | 2015146170 | 10/2015 | |

OTHER PUBLICATIONS

D. Seyferth, et al., 22 Inorganic Chemistry 2163-2167 (1983) (Year: 1983).*
J. M. Roberts, et al., 56 Industrial & Engineering Chemistry Research 11652-11655 (2017) (Year: 2017).*
Simmler_Ullmann's encyclopedia of industrial chemistry. Wiley Interdisciplinary Reviews—RNA 1 (2000)—Silicon Compounds, Inorganic (Year: 2000).*
K. Yasuda, et al, 152.4 Journal of the Electrochemical Society, D69-D74 (2005) (Year: 2005).*
J.M. Brunel, 42 International Journal of Hydrogen Energy, 23004-2300 (2017) (Year: 2017).*
International Search Report and Written Opinion mailed Aug. 9, 2019, in related PCT Application No. PCT/EP2019/061109.

* cited by examiner

*Primary Examiner* — Alexander R Pagano
*Assistant Examiner* — Frank S. Hou
(74) *Attorney, Agent, or Firm* — MASCHOFF BRENNAN

(57) ABSTRACT

The present invention relates to a process for producing and for regenerating siloxane hydrogen carrier compounds.

23 Claims, 6 Drawing Sheets

Step 2:  a) $1\ SiO_2 + 4\ HF \longrightarrow 1\ SiF_4 + 2\ H_2O$
or
        b) $1\ SiO_2 + 1\ Si \longrightarrow 2\ SiO$
or
        c) $1\ SiO_2 + 2\ H_2 \longrightarrow 1\ Si + 2\ H_2O$

Step 3:  a) $1\ SiF_4 + 2\ H_2 \longrightarrow 1\ H_2SiF_2 + 2\ HF$
or
        a') $1\ SiF_4 + 2\ H_2 \longrightarrow 1\ Si + 4\ HF$
or
        b) $1\ SiF_4 + 4\ Na \longrightarrow 1\ Si + 4\ NaF$
or
        c) $2\ SiO + 2\ H_2 \longrightarrow 2\ Si + 2\ H_2O$

Step 4:  $1\ Si + x\ HCl \xrightarrow{\text{multistep process}} 1\ H_2SiCl_2$

Step 5:  a) $1\ H_2SiCl_2 + 1\ H_2O \longrightarrow 1\ [H_2SiO] + 2\ HCl$
or
        b) $1\ H_2SiF_2 + 1\ H_2O \longrightarrow 1\ [H_2SiO] + 2\ HF$

Figure 2

Step 1: 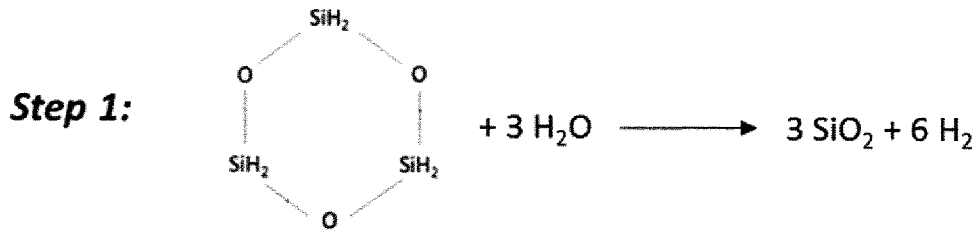 $+ 3\,H_2O \longrightarrow 3\,SiO_2 + 6\,H_2$

Step 2:
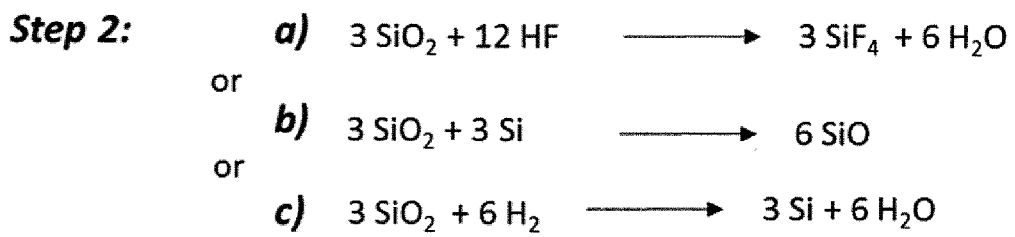
a) $3\,SiO_2 + 12\,HF \longrightarrow 3\,SiF_4 + 6\,H_2O$
or
b) $3\,SiO_2 + 3\,Si \longrightarrow 6\,SiO$
or
c) $3\,SiO_2 + 6\,H_2 \longrightarrow 3\,Si + 6\,H_2O$

Step 3:
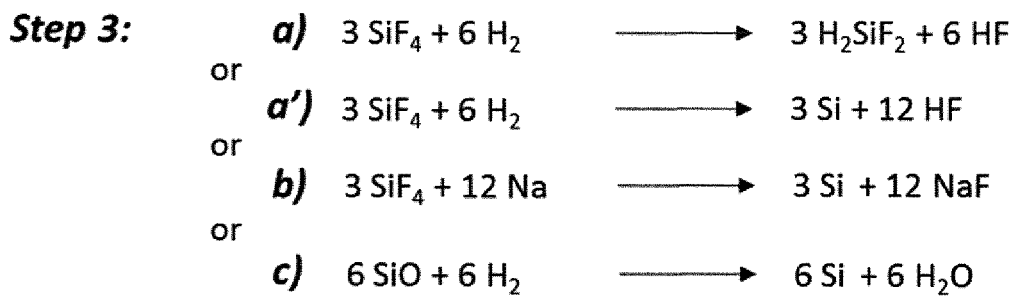
a) $3\,SiF_4 + 6\,H_2 \longrightarrow 3\,H_2SiF_2 + 6\,HF$
or
a′) $3\,SiF_4 + 6\,H_2 \longrightarrow 3\,Si + 12\,HF$
or
b) $3\,SiF_4 + 12\,Na \longrightarrow 3\,Si + 12\,NaF$
or
c) $6\,SiO + 6\,H_2 \longrightarrow 6\,Si + 6\,H_2O$

Step 4:
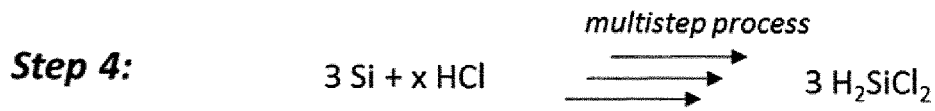
$3\,Si + x\,HCl \xrightarrow{\text{multistep process}} 3\,H_2SiCl_2$

Step 5:
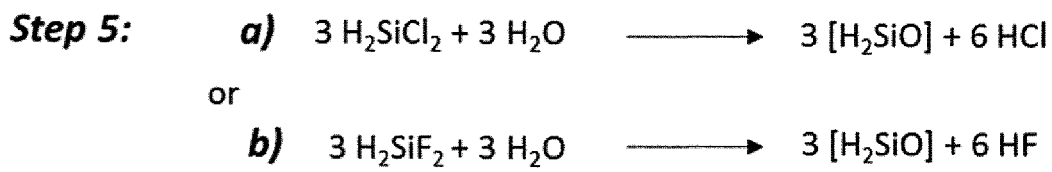
a) $3\,H_2SiCl_2 + 3\,H_2O \longrightarrow 3\,[H_2SiO] + 6\,HCl$
or
b) $3\,H_2SiF_2 + 3\,H_2O \longrightarrow 3\,[H_2SiO] + 6\,HF$

Figure 3

PROCESS FOR PRODUCING AND REGENERATING HYDROGEN CARRIER COMPOUNDS

FIELD OF THE INVENTION

The present invention relates to a process for producing and for regenerating siloxane hydrogen carrier compounds. The present invention also relates to siloxane hydrogen carrier compounds and to a method for producing hydrogen from said siloxane hydrogen carrier compounds.

BACKGROUND

The ability to store, transport and release hydrogen in a safe, convenient, and environment-friendly manner source and to produce and store hydrogen efficiently, economically and safely, are main challenges to be overcome in order to democratize the use of hydrogen as an energy vector.

Currently hydrogen is mainly delivered either by pipeline, by tube trailers as a compressed gas or by special tankers in its liquefied form.

There are typically six routes for hydrogen delivery: it can be transported as a gas by pipeline, it can be produced on site, it can be transported as a compressed gas in tube trailers (for example as disclosed in WO2013/109918 (A1)), it can be transported as a condensed liquid in cryogenic trucks (for example as disclosed in WO2011/141287 (A1)), it can be stored in a solid-state hydrogen carrier material and released on-site (for example as disclosed in WO2009/080986 (A2)), and stored in a liquid-state hydrogen carrier material and released on-site.

Hydrogen can be produced on-site by two means. It can be produced on site by one process and directly consumed in another process which is defined as captive hydrogen. The other mean of on-site production is by water electrolysis, which produces hydrogen from water and electricity. It can be considered producing an environment-friendly hydrogen if powered by renewable energy.

In addition to incumbent delivery solutions which are cryogenic and compressed hydrogen, alternative solutions are emerging to provide hydrogen carriers. Hydrogen carriers are either solid-state or liquid-state materials that have the ability to store hydrogen and release it when needed. They bring advantages either for transport or storage, compared to incumbent solutions. Solid-state carriers include metallic hydrides enabling the uptake of hydrogen, by adsorption onto metal particles resulting in metal hydride. Among them, the magnesium hydride is stable at low pressure and standard temperature, making it convenient to transport and store. When needed, the material is heated to release the hydrogen gas. Solid-state solutions have been identified as best suited for same-site reversible processes of energy storage from renewable energies. Indeed, handling solid materials is not as convenient as handling gas or liquid ones.

Liquid hydrogen carriers can be any liquid-state material able to release hydrogen under specific conditions. The class of Liquid Organic Hydrogen Carriers (LOHC) is the most represented among the liquid hydrogen carriers. During the process called hydrogenation, which is a catalytic reaction, requiring energy in the form of heat, hydrogen is chemically bonded to the liquid organic carrier. Typically the carrier, being unsaturated and/or aromatic hydrocarbons such as toluene, is reacted with hydrogen to produce the corresponding saturated hydrocarbon, to be transported in a liquid-state at standard temperature and pressure, for example as described in WO2014/082801 (A1) or WO2015/146170 (A1). Although the amount of hydrogen to be stored in LOHC depends on the yield of the hydrogenation process it is up to 7.2% mass of hydrogen contained per mass of liquid carrier. Then the hydrogen is released from the saturated hydrocarbons by a process called dehydrogenation, which is a catalytic reaction, requiring additional energy in the form of heat (above 300° C. typically) due to the endothermic nature of the reaction.

In order to produce on-demand hydrogen, heat may be produced from grid electricity (without control on its origin and on its impact on the environment) or heat may be retrieved by burning a part of the organic carrier.

Patent applications WO2010070001 (A1) and EP2206679 (A1) relate to a method for producing hydrogen comprising the steps consisting in: a) reacting a compound (C) comprising one or more groups Si—H with a fluoride ions source, thereby forming hydrogen and a by-product (C1); and b) recovering the obtained hydrogen. All the examples use silane compounds as hydrogen carriers; with the proviso of polymethylhydrosiloxane ("PHMS") in example 12 and tetramethyldisiloxane in example 16.

Patent application WO2011098614 (A1) relates to a method for producing hydrogen comprising the steps of: i) contacting a compound (C) comprising one or more groups Si—H with a phosphorous based catalyst in the presence of a base in water as solvent, thereby forming hydrogen and a by-product (C1) without requiring any energy input (e.g. heat, electrical power, etc. . . . ); and ii) recovering the obtained hydrogen. All the examples use silane compounds as hydrogen carriers; tetramethyldisiloxane is the only siloxane containing compound recited in the lists of potential hydrogen carrier. WO2011098614 (A1) also discloses a step c) of recycling the obtained by-product (C1) with an acyl halide and contacting the obtained product with a metal hydride, thereby regenerating compound (C), wherein the acyl halide is $CH_3C(=O)Cl$ and the metal hydride is $LiAlH_4$.

Patent application WO2010094785 (A1) relates to a method for producing hydrogen comprising the steps of: i) contacting a compound (C) comprising one or more groups Si—H with an amine based catalyst in a solvent selected from an alcohol or an aqueous solution, thereby forming hydrogen and a by-product (C1) without requiring any energy input (e.g. heat, electrical power etc. . . . ); and ii) recovering the obtained hydrogen. Most of the examples use silane compounds as hydrogen carriers; with the proviso of polymethylhydrosiloxane ("PHMS") in example 12 and tetramethyldisiloxane in example 16. WO2010094785 (A) also discloses a step c) of recycling the obtained by-product (C1) with an acyl halide and contacting the obtained product with a metal hydride, thereby regenerating compound (C), wherein the acyl halide is $CH_3C(=O)Cl$ and the metal hydride is $LiAlH_4$.

Whilst WO2010070001 (A1), EP2206679 (A1), WO2011098614 (A1) and WO2010094785 (A1) already represent a breakthrough in the field of hydrogen-based carrier system that releases hydrogen on-demand, said techniques would still benefit from improved efficiency, performance, and cost effectiveness; in addition, since the overall regeneration method of the hydrogen-based carrier according to both WO2011098614 (A1) and WO2010094785 (A1) requires the use of the expensive LiAlH4 reducing agent leading to aluminium oxide by-products, which retreatment process is energy-consuming (a lot of electricity is needed for the electrolysis step), is polluting, and releases carbon dioxide ($CO_2$), carbon monoxide (CO), fluorinated effluents and polycyclic aromatic hydrocarbons (PAH), there is still some progress to be made in order to develop a more environmentally friendly and carbon-free regeneration method applicable to hydrogen-based carrier.

Thus, there remains a need for further improvements in efficiency, performance, and cost effectiveness of such clean energy vectors, for a variety of applications, such as hydrogen delivery and hydrogen infrastructure building. There remains a need for improvements which exhibit greater amounts of hydrogen to be transported, enhanced efficiency, performance and that are cost effective. There remains a critical need for environment-friendly liquid-state hydrogen carriers that are able to release on-demand hydrogen without the need for additional energy. In addition, there remains a need for an integrated clean process wherein hydrogen carriers can not only be used as a valuable hydrogen source but also be produced without requiring carbon containing reactant and/or without carbon emissions, and also be regenerated from the by-products of the hydrogen separation environmentally friendly and without substantial carbon emissions, preferably without carbon emissions.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail using the accompanying drawings in which:

FIG. 2 illustrates example of additional details of the process steps of FIG. 1;

FIG. 3 illustrates an example regeneration process;

DETAILED DESCRIPTION

Figure 1:
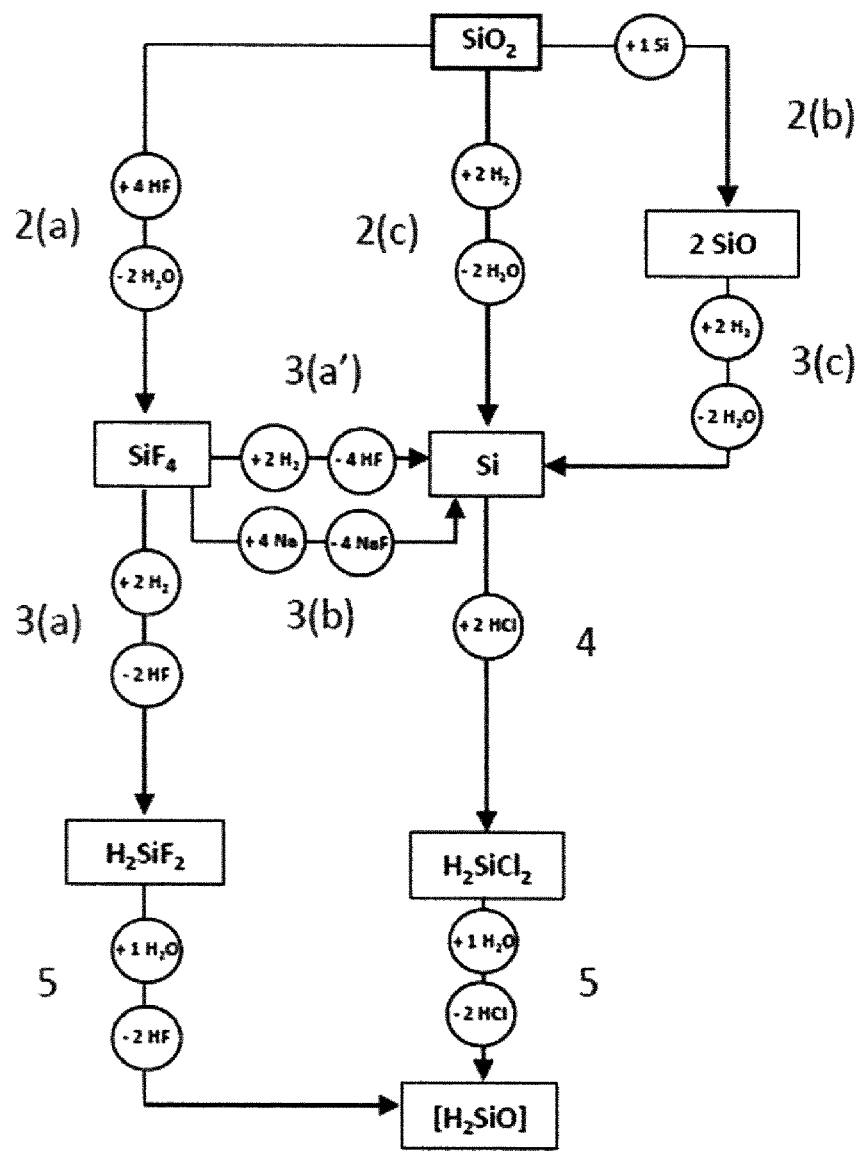
FIG. 1 illustrates one example of a siloxane production process.

It now has been discovered that liquid siloxane hydrogen carrier compounds can be produced from silica compound and/or silicate compound without requiring carbon containing reactant and/or without substantial carbon emissions, preferably without carbon emissions.

The silica compound according to the present invention can be defined as a silica containing compound, and/or a mixture of two or more of said silica containing compounds.

In an embodiment according to the present invention, the silica compound is selected from:

a silica compound of generic formula $SiO_{2x}H_2O$, $[SiO_2]_n$ with n superior or equal to 2, or a mixture of two or more of said silica compounds.

The silicate compound according to the present invention can be defined as a silicate containing compound, and/or a mixture of two or more of said silicate containing compounds.

In an embodiment according to the present invention, the silicate compound is selected from:

a sodium or potassium silicate compound of generic formula $Na_{2x}SiO_{2+x}$ or $K_{2x}SiO_{2+x}$ with x being an integer comprised between 0 and 2, or a silicic acid compound of generic formula $[SiO_x(OH)_{4-x}]^{x-}$ with x being an integer comprised between 0 and 4 or of generic formula $[SiO_x(OH)_{4-2x}]_n$ with when n=1, x=0 or 1 and when n=2, x=1/2 or 3/2, or a silicate compound with a polymeric structure such as a disilicate ion of structure $(Si_2O_7)^{6-}$ or a macroanion of generic structure $[SiO_3^{2-}]$, $[Si_4O_{11}^{6-}]_n$ or $[Si_2O_5^{2-}]_n$ with n superior or equal to 2, or a mixture of two or more of said silicate compounds.

It has also been discovered that liquid siloxane hydrogen carrier compounds can be regenerated without requiring carbon containing reactant and/or without substantial carbon emissions, preferably without carbon emissions.

The most important advantages of the production/regeneration processes of the present invention consist in the possibility to apply it continuously; such continuous process can also, as explained hereafter, be operated without requiring raw materials input and/or without by-product emissions.

It has also been discovered that by using some liquid siloxane hydrogen carrier compounds, hydrogen could be produced in large amounts, with high yields, in a very short time and with very low production costs, without energy input to release it; and it was possible to generate said siloxane hydrogen carrier compounds without substantial carbon emissions, preferably without carbon emissions, by storing energy and recycling the by-products issued from the hydrogen production.

The term "hydrogen carrier compound" can be understood as a chemical compound able to store hydrogen, transport hydrogen and release hydrogen on demand; the characteristic of the hydrogen carrier compounds according to the present invention is that they can store/transport/release hydrogen without requiring any energy input (e.g. heat, electrical power etc. . . . ).

Process for Producing Liquid Siloxane Hydrogen Carrier Compounds

The present invention relates to a process for producing liquid siloxane hydrogen carrier compounds from silica compound and/or silicate compound without requiring carbon containing reactant and/or without substantial carbon emissions, preferably without carbon emissions.

Although the silica and/or silicate compound (B) as defined hereunder is a preferred source for the starting material for the process for producing liquid siloxane hydrogen carrier compounds according to the present invention, silica and/or other silicate containing minerals such as e.g. zircon, jade, mica, quartz, cristobalite, sand etc. . . . can advantageously be used as source of starting material for the process for producing liquid siloxane hydrogen carrier compounds. For the purposes of the present invention and appended claims, the silica and/or silicate compound (B) is preferably a silica compound and/or a silicate compound produced from the hydrolytic oxidation of the siloxane hydrogen carrier compound(s).

Process for Regenerating Siloxane Hydrogen Carrier Compounds

The present invention also relates to a process for regenerating liquid siloxane hydrogen carrier compounds, said process comprising the step of hydrolytic oxidation of the siloxane hydrogen carrier compounds for the production of hydrogen and silica and/or silicate compound (B), and the step of conversion of said silica and/or silicate compound (B) into the liquid siloxane hydrogen carrier compounds, said process not requiring carbon containing reactant and/or without substantial carbon emissions, preferably without carbon emissions.

The production and regeneration of liquid siloxane hydrogen carrier compounds according to the present invention is further detailed and explained in the following description.

Having managed to develop corresponding processes not requiring carbon containing reactant and/or without substantial carbon emissions, preferably without carbon emissions represents a breakthrough in the field of hydrogen energy, hydrogen transport and hydrogen for the automotive industry.

Siloxane Hydrogen Carrier Compounds

In an embodiment of the present invention, the liquid siloxane hydrogen carrier compounds are selected amongst the following compounds.

In an embodiment, the present invention also relates to liquid siloxane hydrogen carrier compounds comprising one or more units of formula (I):

formula (I)

wherein n is an integer (representing the number of repeating units) superior or equal to one, preferably superior or equal to 2, for example superior or equal to 3, or even superior or equal to four. In an embodiment of the present invention, n is inferior or equal to 500, for example inferior or equal to 50.

In an embodiment according to the present invention, the liquid siloxane hydrogen carrier compounds of formula (I) present a cyclic or a linear chemical structure. Such compounds present tremendous advantages compared to their poly(hydromethyl)siloxane analogs ($ROMe_nH_nSi_nO_nR'$). As an example poly(bis(hydro))siloxane can release more than twice (2.61 exactly for the same weight) the amount of hydrogen gas when compared to poly(hydromethyl)siloxane. Also, poly(bis(hydro))siloxane compounds exhibit a full carbon-free recyclability (when used in the hydrogen production and siloxanes production/regeneration processes according to the present invention) compared to analogs containing carbon fragments in their backbone.

In an embodiment of the present invention, the liquid siloxane hydrogen carrier compound of formula (I) is a linear compound, for example a linear compound of formula $ROH_{2n}Si_nO_nR'$ with n being an integer superior or equal to 1, preferably superior or equal to 2, for example superior or equal to 3, or even superior or equal to four, R and R' can advantageously be selected amongst Me, Et, Pr, $^iPr$, Bu, $^tBu$, Ph and/or $SiR''_3$ with R'' being selected amongst H, Me, Et, Pr, $^iPr$, Bu, $^tBu$, and/or Ph. In an embodiment of the present invention, n is inferior or equal to 500, for example inferior or equal to 50.

In a preferred embodiment of the present invention, the liquid siloxane hydrogen carrier compound of formula (I) is a linear compound, for example a linear compound of formula $ROH_{2n}Si_nO_nR'$ with n being an integer superior or equal to 1, preferably superior or equal to 2, for example superior or equal to 3, or even superior or equal to four, wherein R and R' radicals don't contain carbon; R and R' are preferably selected amongst the radicals defined in the previous paragraph wherein R and R' radicals don't contain carbon; R and R' are most preferably $SiH_3$. In an embodiment of the present invention, n is inferior or equal to 500, for example inferior or equal to 50.

For linear siloxane hydrogen carrier compounds, a carbon-free radical (e.g. $SiH_3$) chain end is selected since it presents many advantages (compared to other carbon containing chain ends such as $SiMe_3$ for instance):
  lower molecular weight allowing a better weight gravimetric efficiency of the siloxane compound, meaning a higher ratio between the weight of hydrogen carried by the compound compared to its overall molecular weight.
  Straightforward and without any carbon emissions recycling of the $SiH_3$ chain end when compared to $SiMe_3$ for instance since $H_3SiCl$ is a by-product of the regeneration process (cf. step 4), which is hence valued, and does not require outside raw material input for its recycling.

In a preferred embodiment according to the present invention, the liquid siloxane hydrogen carrier compounds don't contain carbon atoms. However, for the purpose of the present invention and appended claims, and in order to prevent an undue restriction of the scope of the present invention, the Applicants have used the expression "without substantial carbon emissions" to tolerate some carbon emissions; for example, the siloxane hydrogen carrier compounds of the present invention may comprise carbon as long as the corresponding carbon content of said siloxane hydrogen carrier compounds is lower than 25 wt %. The said carbon content can be calculated by performing the ratio between the molecular weight (in g/mol) of all the carbon atoms contained in the siloxane hydrogen carrier compound and the total molecular weight (in g/mol) of the siloxane hydrogen carrier compound. In an embodiment according to the present invention, the carbon content is lower than 10 wt %, preferably lower than 5 wt %, for example lower to 2 wt %, or even more preferably equal to 0 wt %.

In a preferred embodiment according to the present invention,
  when the liquid siloxane hydrogen carrier compounds are carbon free, there is no carbon emissions, and
  when the siloxane hydrogen carrier compounds contain carbon, the corresponding carbon emissions would be less than 0.924 kg of $CO_2$ per kg of produced and/or recycled siloxane hydrogen carrier compound, preferably less than 0.462, more preferably less than 0.231, for example less than 0.1 or even less than 0.05 kg of $CO_2$.

In a preferred embodiment of the present invention, the liquid siloxane hydrogen carrier compound of formula (I) is a cyclic compound, for example a cyclic compound of formula $H_{2n}Si_nO_n$ with n being an integer superior or equal to 2, for example superior or equal to 3, or even superior or equal to four. In an embodiment of the present invention, n is inferior or equal to 500, for example inferior or equal to 32, for example inferior or equal to 17. In an embodiment of the present invention, the liquid siloxane hydrogen carrier compounds consist in one of the above defined siloxane hydrogen carrier compounds of formula (I).

In another embodiment of the present invention, the liquid siloxane hydrogen carrier compounds consist in a mixture of two or more of any of the above defined siloxane hydrogen carrier compounds of formula (I).

In this "mixture" embodiment, when linear siloxane hydrogen carrier compounds of formula (I) represent the main species in weight in the mixture (i.e. represent more than 50 percent by weight), it is advantageous to restrict the amount of cyclic siloxane hydrogen carrier compounds of formula (I) to less than 20 percent by weight, for example less than 10 percent by weight in the mixture; in an embodiment, more than 0.01 percent by weight, or even more than 0.1 percent by weight of cyclic siloxane hydrogen carrier compounds of formula (I) can advantageously be present in said mixture.

In this "mixture" embodiment, when cyclic siloxane hydrogen carrier compounds of formula (I) represent the main species in weight in the mixture (i.e. represent more than 50 percent by weight), it is advantageous to restrict the amount of linear siloxane hydrogen carrier compounds of formula (I) to less than 20 percent by weight, for example less than 10 percent by weight in the mixture; 0.01 percent by weight, or even 0.1 percent by weight of linear siloxane hydrogen carrier compounds of formula (I) can advantageously be present in said mixture.

In an embodiment according to the present invention, the liquid siloxane hydrogen carrier compounds of formula (I) present a dynamic viscosity between 0.1 and 10000 mPa·s at a temperature of 20° C. and a pressure of $1.01325 \times 10^5$ Pa. In an embodiment according to the present invention, the liquid siloxane hydrogen carrier compounds of formula (I) present a dynamic viscosity between 0.2 and 50 mPa·s at a temperature of 20° C. and a pressure of $1.01325 \times 10^5$ Pa. The dynamic viscosity at a temperature of 20° C. and a pressure of $1.01325 \times 10^5$ Pa of the siloxane hydrogen carrier compounds of formula (I) can be measured according to any appropriate method; for example, it can be determined according to the ISO 1628-1 norm.

In an embodiment according to the present invention, the molecular weight of the liquid cyclic siloxane hydrogen carrier compounds of formula (I) may range from 130 to 800 g/mol. The molecular weight of the siloxane hydrogen carrier compounds of formula (I) can be measured according to any appropriate method; for example, it can be determined by GC-MS, e.g. a GC-MS analysis performed on an Agilent GC/MSD 5975C apparatus.

In an embodiment according to the present invention, the number average molecular weight ($M_n$) and/or the molecular weight distribution (Đ) of the liquid linear siloxane hydrogen carrier compounds of formula (I) may range from 64 to 30 000 g/mol and from 1.1 to 50, respectively. The average molecular weight and the molecular weight distribution of the linear siloxane hydrogen carrier compounds of formula (I) can be measured according to any appropriate method; for example, it can be determined according to the ISO 16014 norm.

In an embodiment according to the present invention, the liquid cyclic siloxane hydrogen carrier compounds of formula (I) present a characteristic strong and sharp absorption band between 800 and 1000 cm$^{-1}$ corresponding to the SiH$_2$ units, when analysed by FT-IR. In an embodiment according to the present invention, the cyclic siloxane hydrogen carrier compounds of formula (I) present a characteristic strong and sharp absorption band between 850 and 950 cm$^{-1}$.

Figure 4:
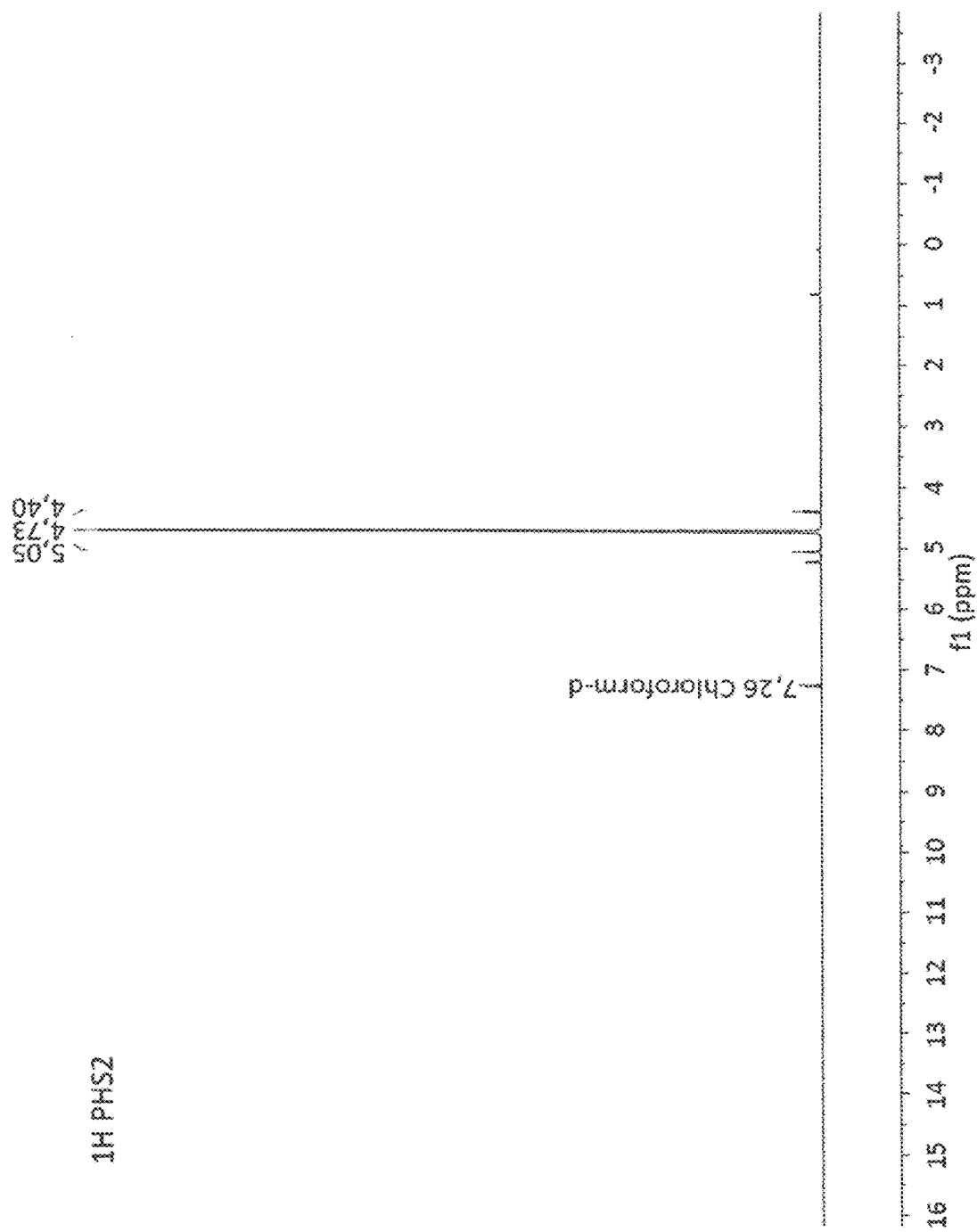
FIG. 4 illustrates a graph of a Nuclear Magnetic Resonance (NMR) spectroscopy analysis.

In an embodiment according to the present invention, the liquid cyclic siloxane hydrogen carrier compounds of formula (I) present a characteristic resonance between 4.5 and 4.9 ppm corresponding to the SiH$_2$O units, when analysed by $^1$H NMR in CDCl$_3$ at 25° C. as exemplified in FIG. 4. $^1$H NMR analyses can be performed on any appropriate spectrometer, e.g. a 400 MHz Bruker spectrometer.

Figure 5:
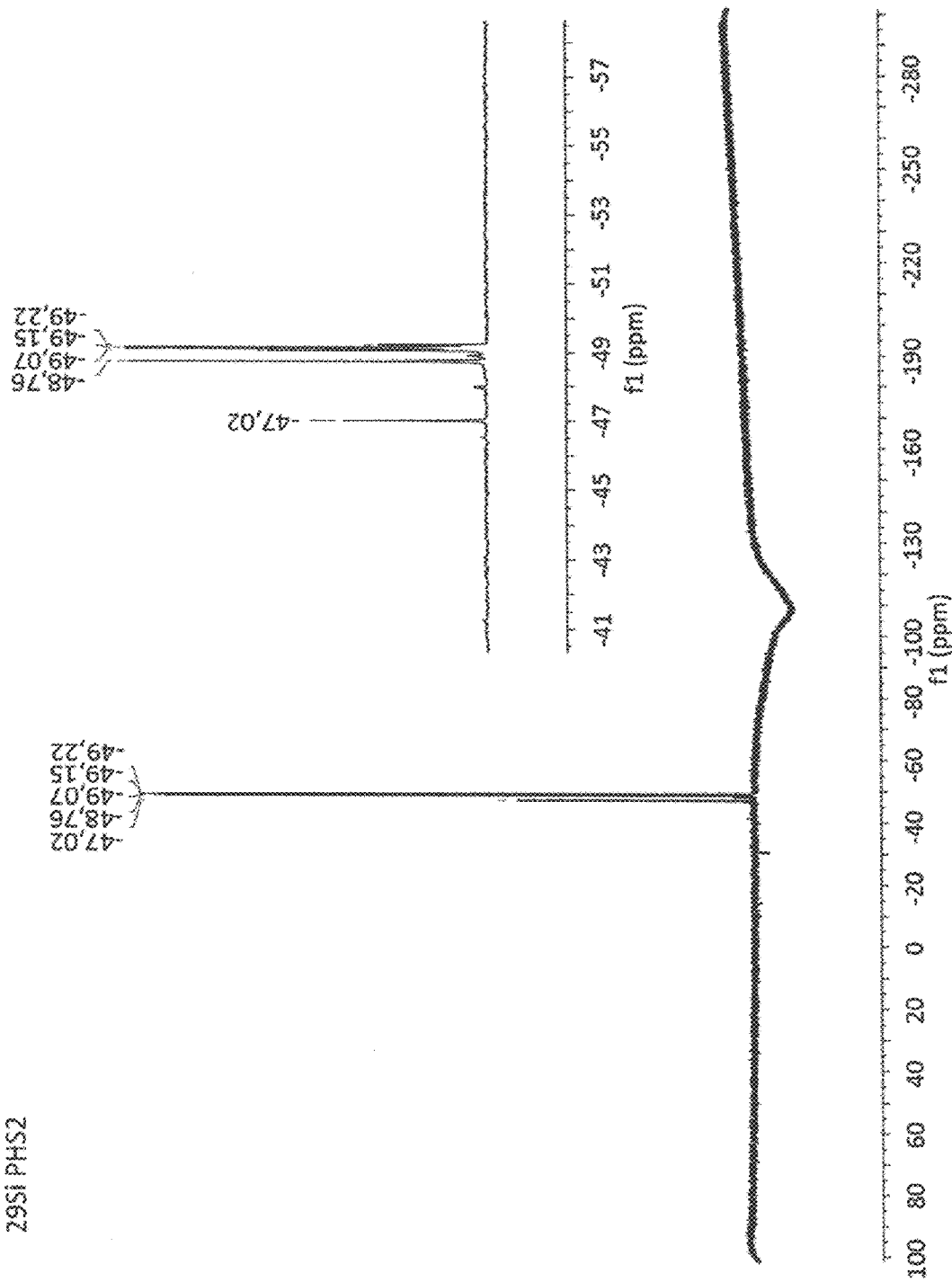
FIG. 5 illustrates another graph of a NMR spectroscopy analysis.

In an embodiment according to the present invention, the liquid cyclic siloxane hydrogen carrier compounds of formula (I) present a characteristic resonance between −45 and −50 ppm corresponding to the SiH$_2$O units, when analysed by $^{29}$Si NMR in CDCl$_3$ at 25° C. as exemplified in FIG. 5. $^{29}$Si NMR analyses can be performed on any appropriate spectrometer, e.g. a 400 MHz Bruker spectrometer.

In an embodiment according to the present invention, the liquid siloxane hydrogen carrier compounds of formula (I) present a refractive index between 1 and 2 at a temperature of 20° C. and at a wavelength of 589 nm. In an embodiment according to the present invention, the liquid siloxane hydrogen carrier compounds of formula (I) present a refractive index between 1.2 and 1.5 at a temperature of 20° C. and at a wavelength of 589 nm. The refractive index of the siloxane hydrogen carrier compounds of formula (I) can be measured according to any appropriate method; for example, it can be determined according to the ASTM D1218 norm.

In an embodiment according to the present invention, the liquid siloxane hydrogen carrier compounds of formula (I) present a boiling point between 30 and 500° C., for example between 50 and 500° C., at a pressure of $1.01325 \times 10^5$ Pa, for example a boiling point comprised between 50 and 150° C. The boiling point of the liquid siloxane hydrogen carrier compounds of formula (can be measured according to any appropriate method; for example, it can be determined according to the ISO 918 norm.

In an embodiment according to the present invention, the liquid siloxane hydrogen carrier compounds of formula (I) present a flash point between 50 and 500° C. The flash point of the siloxane hydrogen carrier compounds of formula (I) can be measured according to any appropriate method; for example, it can be determined according to the ISO 3679 norm.

In an embodiment according to the present invention, the liquid siloxane hydrogen carrier compounds of formula (I) are selected amongst the cyclic siloxane compounds having the formula

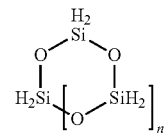

wherein n is an integer (representing the number of repeating units) superior or equal to one, preferably superior or equal to 2, for example superior or equal to 3, or even superior or equal to four. In an embodiment of the present invention, n is inferior or equal to 500, for example inferior or equal to 32, for example inferior or equal to 17. In an embodiment according to the present invention, the liquid siloxane hydrogen carrier compounds consist in any mixture of two or more of the said liquid cyclic siloxane compounds.

In an embodiment according to the present invention, the liquid siloxane hydrogen carrier compounds of formula (I) are selected amongst the linear siloxane compounds having the formula

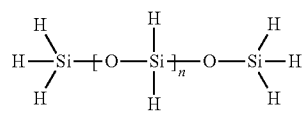

with n being an integer superior or equal to 1, preferably superior or equal to 2, for example superior or equal to 3, or even superior or equal to four. In an embodiment of the present invention, n is inferior or equal to 500, for example inferior or equal to 50. In an embodiment according to the present invention, the liquid siloxane hydrogen carrier compounds consist in any mixture of two or more of the said liquid linear siloxane compounds.

According to the present invention, the siloxane hydrogen carrier compounds of formula (I) are liquid (at normal temperature and pressure (NTP); e.g. at a temperature of 20° C. and an absolute pressure of $1.01325 \times 10^5$ Pa).

The present invention also relates to hydrogen carrier compounds comprising a mixture of the siloxane hydrogen carrier compounds of formula (I) and water. For the purpose of the hydrogen production process according to the present invention, said water is considered as a reactant. Water can advantageously be selected from various sources such as for example fresh water, running water, tap water, salt water, deionized water and/or distilled water.

In an embodiment of the present invention, the said mixture of the siloxanes and water is characterised by a water/[$SiOH_2$] unit molar ratio which is superior or equal to 0.1. In an embodiment of the present invention, the said mixture of the siloxanes and water is characterised by a water/[$SiOH_2$] unit molar ratio which is comprised between 2 and 10, for example between 2 and 2.5. For example, for a polyhydrosiloxane "PHS", the corresponding water/PHS mixture will be characterised by a molar ratio value calculated as Ratio $H_2O/PHS = (m_{H2O}/M_{H2O})/(m_{PHS}/M_{SiH2O}) = (m_{H2O}/18)/(m_{PHS}/46.11)$.

The present invention also relates to hydrogen carrier compounds comprising a mixture of the siloxane hydrogen carrier compounds of formula (I) and at least one hydrogen release initiator and water. For the purpose of the hydrogen production process according to the present invention, said hydrogen release initiator is considered as a reagent. There is no restriction regarding the type of hydrogen release initiator which can be used according to the present invention as long as it favours the hydrolytic oxidation of the siloxane hydrogen carrier compounds of formula (I); and thus the siloxane reaction leading to the corresponding hydrogen release. For example, any compound which will favour the hydrolytic oxidation of the siloxane can advantageously be used as hydrogen release initiator.

In an embodiment according to the present invention, the hydrogen release initiator is selected amongst one or more compounds of the following list:
- a mineral base. For example, the mineral base can be an alkaline or alkaline-earth metal hydroxide such as potassium hydroxide or sodium hydroxide, the sodium hydroxide being particularly preferred;
- a compound able to release a nucleophile able to perform the hydrolytic oxidation of the siloxane hydrogen carrier compound such as, for example, a compound of formula RR'R"R"'ZY with Z being N or P, Y being OH, F, Cl or Br and R, R', R" and R"' can be advantageously selected amongst $C_1$-$C_{15}$ alkyl or $C_6$-$C_{10}$ aryl, with R, R', R", R"' being the same of different;
- a homogeneous organometallic catalyst able to promote the hydrolytic oxidation of the siloxane hydrogen carrier compound such as, for example, organometallic complexes based on iron, ruthenium, rhenium, rhodium, copper, chromium, iridium, zinc, and/or tungsten, etc . . . ; and
- a heterogeneous catalyst able to promote the hydrolytic oxidation of the siloxane hydrogen carrier compound such as, for example, metal nanoparticles, [M/AlO(H), M=Pd, Au, Rh, Ru, and Cu], Pd/C and/or any of the aforementioned metal preferably immobilized on an inorganic support.

In an embodiment of the present invention the hydrogen release initiator is selected amongst carbon-free hydrogen release initiator, e.g. sodium hydroxide.

The present invention also relates to hydrogen carrier compounds comprising a mixture of the siloxane hydrogen carrier compounds of formula (I), water, a hydrogen release initiator as defined above and, optionally, a catalyst C. For the purpose of the hydrogen production process according to the present invention, said catalyst C is considered as a reagent. There is no restriction regarding the type of catalyst C which can be used according to the present invention as long as it increases the kinetic (i.e. the speed at which the hydrogen is released) of the hydrolytic oxidation of the siloxane hydrogen carrier compounds of formula (I); and thus the water/siloxane/hydrogen release initiator/catalyst C reaction leading to the corresponding hydrogen release. For example, any compound which will significantly increase the kinetic of the hydrolytic oxidation of the siloxane can advantageously be used as catalyst C.

In an embodiment according to the present invention, the catalyst C is selected amongst one or more compounds of the following list:
- a phosphorous based catalyst (for example a polymer-supported catalyst bearing one or more phosphorous groups);
- an amine based catalyst (for example a polymer-supported catalyst bearing one or more amine groups), or an ammonium salt, for example RR'R"R"'NOH with R, R', R", R"' being a $C_1$-$C_{15}$ alkyl or a $C_6$-$C_{10}$ aryl, and R, R', R", R"' being the same of different;
- fluoride ions source catalyst (for example tetrabutylammonium fluoride); and
- hexamethylphosphoramide ("HMPA").

In an embodiment of the present invention, none of the above individually recited catalyst C is used during the hydrogen production process.

In an embodiment of the present invention, the said mixture of siloxanes, water and hydrogen release initiator and optional catalyst C is characterised by a hydrogen release initiator/[$SiOH_2$] unit molar ratio which is superior or equal to 0.01. In an embodiment of the present invention, the said mixture of siloxanes, water and hydrogen release initiator is characterised by a hydrogen release initiator/[$SiOH_2$] unit molar ratio which is comprised between 0.05 and 3, for example between 0.05 and 0.35.

In an embodiment of the present invention, the said mixture of siloxanes, water, hydrogen release initiator and catalyst C is characterised by a molar ratio of the catalyst relative to the [$SiOH_2$] monomer units in compound (I) which ranges from 0.01 to 0.5. Preferably the molar ratio of the catalyst C relative to the [$SiOH_2$] monomer units in compound (I) ranges from 0.02 to 0.1. More preferably the molar ratio of the catalyst C relative to the [$SiOH_2$] monomer units in compound (I) is lower than 0.05, e.g equal to 0.04.

For the purpose of the above calculations of the initiator and catalyst C to [$SiOH_2$] unit molar ratios, when the chosen compound falls at the same time under the hydrogen release initiator definition and the catalyst C definition, it is its total amount which is used for both ratios.

Hydrogen Production

The present invention also relates to a method for the production of hydrogen by hydrolytic oxidation of siloxanes in the presence of water wherein the siloxanes are liquid siloxane hydrogen carrier compounds comprising one or more units of formula (I):

formula (I)

wherein n is an integer (representing the number of repeating units) superior or equal to one, preferably superior or equal to 2, for example superior or equal to 3, or even superior or equal to four. In an embodiment of the present invention, n is inferior or equal to 500, for example inferior or equal to 50.

In an embodiment according to the present invention, the siloxane hydrogen carrier compounds of formula (I) are selected amongst the liquid siloxanes already defined hereinabove.

In an embodiment according to the present invention, the method for the production of hydrogen is characterised in that the water/[SiOH$_2$] unit molar ratio is superior or equal to 0.1. In an embodiment of the present invention, the said mixture of the siloxanes and water is characterised by a water/[SiOH$_2$] unit molar ratio which is comprised between 2 and 10, for example between 2 and 2.5.

In an embodiment of the present invention, the method for the production of hydrogen is characterised in the presence of at least one hydrogen release initiator during the hydrolytic oxidation of siloxanes in the presence of water. There is no restriction regarding the type of hydrogen release initiator which can be used according to the present invention as long as it favours the hydrolytic oxidation of the siloxane hydrogen carrier compounds of formula (I); and thus the water/siloxane reaction leading to the corresponding hydrogen release. For example, any compound which will favour the hydrolytic oxidation of the siloxane can advantageously be used as hydrogen release initiator; useful hydrogen release initiators have already been defined hereinabove. In an embodiment of the present invention, the said mixture of siloxanes, water and hydrogen release initiator and optional catalyst C is characterised by a hydrogen release initiator/[SiOH$_2$] unit molar ratio which is superior or equal to 0.01. In an embodiment of the present invention, the said mixture of siloxanes, water and hydrogen release initiator is characterised by a hydrogen release initiator/[SiOH$_2$] unit molar ratio which is comprised between 0.05 and 3, for example between 0.05 and 0.35.

In an embodiment of the present invention, the method for the production of hydrogen is characterised in the presence of a mixture of the siloxane hydrogen carrier compounds of formula (I), water, a hydrogen release initiator as defined above and a catalyst C. There is no restriction regarding the type of catalyst C which can be used according to the present invention as long as it increases the kinetic (i.e. the speed at which the hydrogen is released) of the hydrolytic oxidation of the siloxane hydrogen carrier compounds of formula (I); and thus the water/siloxane/hydrogen release initiator/catalyst C reaction leading to the corresponding hydrogen release. For example, any compound which will significantly increase the kinetic of the hydrolytic oxidation of the siloxane can advantageously be used as catalyst C; useful catalysts C have already been defined hereinabove. In an embodiment of the present invention, the said mixture of siloxanes, water, hydrogen release initiator and catalyst C is characterised by a molar ratio of the catalyst relative to the [SiOH$_2$] monomer units in compound (I) which ranges from 0.01 to 0.5. Preferably the molar ratio of the catalyst C relative to the [SiOH$_2$] monomer units in compound (I) ranges from 0.02 to 0.1. More preferably the molar ratio of the catalyst C relative to the [SiOH$_2$] monomer units in compound (1) is lower than 0.05, e.g equal to 0.04.

The present invention also relates to the use of the selected siloxane hydrogen carrier compounds of formula (I) for the production of hydrogen.

There is no restriction regarding the methods which can be used for the hydrogen production method according to the present invention as long as the hydrogen release from the water/hydrogen carrier compounds of formula (I) may not require additional energy and satisfies the hydrogen industry requirements.

In an embodiment according to the present invention, the temperature of the method for the production of hydrogen from siloxane hydrogen carrier compounds of formula (I) may vary in a wide range, and may range notably from 0 to 200° C. More preferably, the temperature ranges from 15 to 30° C.

In an embodiment according to the present invention, the pressure of the method for the production of hydrogen from siloxane hydrogen carrier compounds of formula (I) may vary in a wide range, and may range notably from $1 \times 10^5$ Pa to $500 \times 10^5$ Pa.

In an embodiment according to the present invention, the method for the production of hydrogen from siloxane hydrogen carrier compounds of formula (I) can tolerate the presence of a solvent. There is no restriction regarding the type of solvent which can be used for the hydrogen production method according to the present invention as long as the hydrogen release from the hydrogen carrier compounds of formula (I) satisfies the hydrogen industry requirements. In an embodiment according to the present invention, said solvent is selected from alcohol (e.g. methanol), aqueous solvents, organic solvents and/or a mixture of two or more of said solvents. For the purpose of the hydrogen production process according to the present invention, said solvent is considered as a reagent.

In an embodiment according to the present invention, the method for the production of hydrogen from siloxane hydrogen carrier compounds of formula (I) comprises the following steps: a) contacting the siloxane hydrogen carrier compounds of formula (I) and a catalyst C to form a siloxane/catalyst mixture and: b) combining the siloxane with an aqueous solution of the hydrogen release initiator, in the presence of a catalyst C, to produce hydrogen. Steps a) and b) may occur consecutively or simultaneously.

In an embodiment according to the present invention, the reaction mixture used in the method for the production of hydrogen from siloxane hydrogen carrier compounds of formula (I) is characterised in that
  the siloxane hydrogen carrier compounds of formula (I),
  corresponding silicate-type by-products,
  hydrogen,
  the water,
  the hydrogen release initiator(s), and
  the optional catalyst, and
  the optional solvents
represent at least 90 percent by weight of the said reaction mixture, preferably at least 95 percent by weight, for example at least 99 percent by weight.

In an embodiment, the present invention also relates to a device for producing hydrogen according to the method hereabove described, said device comprising a reaction chamber comprising:
- a reaction mixture inlet, said mixture comprising the siloxane hydrogen carrier compounds of formula (I) and an optional solvent;
- an hydrogen outlet;
- optionally a by-product collector; and
- optionally a surface intended to be in contact with said mixture, coated with a polymer supported catalyst as described hereabove.

Liquid Siloxane Production and Liquid Siloxane Regeneration

As explained hereinabove, the main objectives of the present invention are both to produce the hydrogen carrier compounds and to regenerate the hydrogen carrier compounds by recycling the by-products issued from the hydrogen production, environmentally friendly and/or without substantial carbon emissions, preferably without carbon emissions.

Thus, the present invention relates to a process for producing liquid siloxane hydrogen carrier compounds from silica compound and/or silicate compound, preferably from silica and/or silicate compound (B), without requiring carbon containing reactant and/or without substantial carbon emissions, preferably without carbon emissions.

The present invention also relates to a process for regenerating siloxane hydrogen carrier compound(s), said process comprising the step of hydrolytic oxidation of siloxane hydrogen carrier compound(s) for the production of hydrogen and silica and/or silicate compound(s) (B), and the steps of conversion of said silica and/or silicate compound(s) (B) into siloxane hydrogen carrier compounds, preferably the same siloxane hydrogen carrier compound(s), said process not requiring carbon containing reactant and/or without substantial carbon emissions, preferably without carbon emissions.

In an embodiment according to the present invention, there is provided a process for the production of a liquid siloxane hydrogen carrier compound consisting in reaction routes X, Y, or Z comprising the following consecutive steps:
providing silica compound and/or silicate compound,
for reaction route X,
subjecting the silica compound and/or silicate compound to a halogenation step to produce silicon tetrahalide,
subjecting the silicon tetrahalide to a reduction step to produce halosilane, and
subjecting the halosilane to a hydrolysis step to produce the liquid siloxane hydrogen carrier compound;
for reaction route Y,
subjecting the silica compound and/or silicate compound to a reduction step to produce silicon,
subjecting silicon to a hydrohalogenation step to produce halosilane, and
subjecting the halosilane to a hydrolysis step to produce the liquid siloxane hydrogen carrier compound;
for reaction route Z,
subjecting the silica compound and/or silicate compound to a halogenation step to produce silicon tetrahalide,
subjecting the silicon tetrahalide to a reduction step to produce silicon,
subjecting silicon to a hydrohalogenation step to produce halosilane, and
subjecting the halosilane to a hydrolysis step to produce the liquid siloxane hydrogen carrier compound.

Silicate/Silica.

In an embodiment to the present invention, i.e. when a silicate is selected as starting material of the siloxane production/regeneration process, an additional treatment (e.g. solvent evaporation, chemical treatment by an acid, pyrolysis . . . ) of the silicate could advantageously be used to obtain silica ($SiO_2$), the latter being used as the raw material of the siloxane process.

In an embodiment to the present invention, the silica and/or the silicate compound could be subjected to an additional mechanical treatment, e.g. grinding and/or sieving, prior to be subjected to the reduction step of reaction route Y and/or prior to be subjected to the halogenation step of reaction routes X and Z.

In an embodiment to the present invention pertaining to reaction route Y, its initial step of subjecting the silica compound and/or silicate compound to a reduction step to produce silicon can be performed in one or two steps; for example, a one-step reduction process or a two-steps reduction process with intermediate production of SiO.

For the purpose of the present description and appended claims, the following numbering has been used for the individual reaction steps:
for reaction routes X and Z,
halogenation of the silica and/or silicate compound for the production of silicon tetrahalide corresponds to step 2(a); any suitable halide source can be used for step 2(a) as long as it favours the production of silicon tetrahalide;
for reaction route Y,
Step 2(c) corresponds to the one-step reduction of the silica compound and/or silicate compound to produce silicon;
Steps 2(b) and 3(c) correspond to the two-steps reduction of the silica compound and/or silicate compound to produce silicon;
for reaction route Z,
Steps 3(a') and/or Step 3(b) corresponds to the reduction of the silicon tetrahalide to produce silicon;
for reaction route X,
Step 3(a) corresponds to the reduction of the silicon tetrahalide to produce halosilane;
for reaction routes Y and Z,
Step 4 corresponds to the hydrohalogenation process of silicon to produce halosilane;
for reaction routes X, Y and/or Z,
Step 5 corresponds to the hydrolysis of the halosilane to produce the liquid siloxane hydrogen carrier compound.

For illustrative and non-limiting purposes, an example of the siloxane production process is detailed in FIG. 1, and FIG. 2 illustrates examples of the individual process steps;

In FIG. 2, step 3(b), in the case where Na is used as reducing agent (step 3(b)), the formed 4 equivalents of NaF are recycled to regenerate 4 Na and 4 HF in a process which is not disclosed here.

In FIG. 2, step 3(c), in the case where the hydrogen gas reduction of SiO route is employed (step 3(c)), 2 equivalents of Si are formed. One equivalent of the latter can advantageously be reinjected in the step 2(b) in order to avoid any input of Si into the process and the other equivalent (the "excess" content) is advantageously consumed in the next step 4 of the process.

In FIG. 2, step 4 of the production process is a multistage process which is not fully disclosed here.

In an embodiment according to the present invention, there is provided a process for the regeneration of liquid siloxane hydrogen carrier compound(s) comprising the hydrolytic oxidation of siloxane hydrogen carrier compound(s) for the production of hydrogen and silica and/or silicate compound (B) followed by reaction routes X, Y, or Z comprising the following consecutive steps:

for reaction route X,
  subjecting the silica compound and/or silicate compound (B) to a halogenation step to produce silicon tetrahalide,
  subjecting the silicon tetrahalide to a reduction step to produce halosilane, and
  subjecting the halosilane to a hydrolysis step to regenerate liquid siloxane hydrogen carrier compound(s), preferably the same liquid siloxane hydrogen carrier compound(s);

for reaction route Y,
  subjecting the silica compound and/or silicate compound (B) to a reduction step to produce silicon,
  subjecting silicon to a hydrohalogenation step to produce halosilane, and
  subjecting the halosilane to a hydrolysis step to regenerate liquid siloxane hydrogen carrier compound(s), preferably the same liquid siloxane hydrogen carrier compound(s);

for reaction route Z,
  subjecting the silica compound and/or silicate compound (B) to a halogenation step to produce silicon tetrahalide,
  subjecting the silicon tetrahalide to a reduction step to produce silicon,
  subjecting silicon to a hydrohalogenation step to produce halosilane, and
  subjecting the halosilane to a hydrolysis step to regenerate liquid siloxane hydrogen carrier compound(s), preferably the same liquid siloxane hydrogen carrier compound(s).

For illustrative and non-limiting purposes, an example of the regeneration process starting from the siloxane hydrogen carrier compound Tri(bis(hydro)cyclosiloxane) (with 3 repeating units "D3") is detailed in FIG. 3;
  In FIG. 3, step 3(b), in the case where Na is used as reducing agent, the formed 4 equivalents of NaF are recycled to regenerate 4 equivalents of Na and 4 equivalents of HF in a process which is not disclosed here.
  In FIG. 3, step 3(c), in the case where the hydrogen gas reduction of SiO route is employed (step 3(c)), 2 equivalents of Si are formed. One equivalent of the latter is reinjected is the step 2(b) in order to avoid any input of Si into the process and the other equivalent (the "excess" content) is advantageously consumed in the next step 4 of the process.

Said regenerated siloxane hydrogen carrier compounds can advantageously be used in the hydrogen production method according to the present invention which allows to re-start the cycle.

A tremendous advantage brought by the polydihydrosiloxane compounds according to the present invention as hydrogen-based energy carriers (contrarily to PHMS and TMDS due to the presence of the non-hydrolysable methyl moiety bonded to the central silicon atom) is that their complete hydrolysis during the hydrogen liberation process leads uniquely a silica/silicate compound(s) (B); said silica/silicate compound(s) (B) being a straightaway starting material for an environmentally friendly and/or without substantial carbon emissions (preferably completely carbon-free) process, exhaustively exemplified and atom-economic regeneration process allowing to recover the exact starting fuel oil.

Step 2(a)—Halogenation of Silica/Silicate-Type Products (Reaction Routes X or Z)

In an embodiment according to the present invention, there is provided a method for the halogenation of the silica/silicate compound (B) by an halide source for the production of silicon tetrahalide compound. Any halide source can advantageously be used. Hydrogen halide is a preferred halide source; said hydrogen halide can advantageously be an aqueous solution or a gas, for example hydrogen fluoride (HF). For example, when hydrogen fluoride is used for the halogenation step, silicon tetrafluoride and water as by-product are formed; the water can be collected in order to be reused in a further step of the process or electrolysed, forming hydrogen and oxygen gas, the former being e.g. directly consumed by the next step of the process.

Step 2(b)—Reduction of Silica/Silicate Type Products to Form SiO (Reaction Route Y—First Step of the Two-Steps Reduction)

In an embodiment according to the present invention, there is provided a method for the reduction of the silica/silicate compound (B) in the presence of elemental silicon for the production of SiO. Any source of elemental silicon can advantageously be used.

Metallurgical grade silicon is a preferred elemental silicon source. Since elemental silicon is used for the reduction step, two equivalents of SiO are formed per transformed silicate; the formed SiO being e.g. directly consumed by the step 3(c) of the process.

An example of process of Si production from silica/silicate compound (B) symbolized in this case as silica (SiO$_2$) which is a combination of steps 2(b) and 3(c) can be found in FIG. 1.

Step 2(c)—Reduction of Silica/Silicate Type Products to Form Si (Reaction Route Y—One-Step Reduction In an embodiment according to the present invention, there is provided a method for the reduction of the silica/silicate compound (B) in the presence of hydrogen gas for the production of elemental silicon. The elemental silicon produced can be either metallurgical or photovoltaic grade. Other gas(es) can optionally be employed in addition to hydrogen, e.g. an inert gas such as argon or nitrogen. Since the reaction of reduction of silica/silicate compounds by hydrogen is endothermic, a heat source is required; any source of heat can be selected, e.g. electric arc technology, induction heating, microwave, hot filament, plasma technology. Plasma is particularly preferred; for example, a corresponding plasma technology can advantageously comprise a plasma torch allowing to create a plasma jet.

The plasma jet is preferably made from hydrogen gas, with or without additional gas(es) (such as, for example, argon), going through electrodes. Silica can be introduced into the hydrogen plasma jet under vacuum prior to react in the gas phase with hydrogen at a temperature comprised between 2000 and 20 000° K to form silicon and water. Silicon is then condensed and recovered as a solid.

The reduction reaction of silica/silicate compounds by hydrogen gas produces water as by-product. The formed water can advantageously be used as chemical reactant, and/or as heating source for other utilities and/or can be transformed in an electrolyser to reform hydrogen gas and/or can be used to run a steam turbine to produce electricity.

Steps 3(a) and 3(a')—Reduction of the Silicon Tetrahalide

In an embodiment according to the present invention, there is provided a method for the reduction of the silicon tetrahalide compound by hydrogen gas (e.g. the hydrogen formed by electrolysis of water collected from the previous step; or hydrogen recovered from another step of the process; or from fatal hydrogen collected from an external process) for the production of elemental silicon [step 3(a')] and/or halosilane(s) [step 3(a)], for example silane ($SiH_4$), monohalosilane ($H_3SiX$) and/or dihalosilane ($H_2SiX_2$) and/or trihalosilane ($HSiX_3$) and/or tetrahalosilane ($SiX_4$). In the case where silicon tetrafluoride ($SiF_4$) is used as silicon tetrahalide source, the reduction step employing hydrogen gas can lead to elemental silicon and release hydrogen fluoride (HF) as by-product [step 3(a')]. A partial reduction may also occur leading to monofluorosilane and/or difluorosilane and/or trifluorosilane and/or tetrafluorosilane and release hydrogen fluoride (HF) as by-product [step 3(a)]. Said formed HF can advantageously be reinjected in the above halogenation step [step 2(a)] leading to an equilibrated material balance over the steps (2) and (3) of the production/regeneration process.

Step 3(b)—Reduction of the Silicon Tetrahalide Compound

In an embodiment according to the present invention, there is provided a method for the reduction of the silicon tetrahalide compound by a metallic reductant for the production of elemental silicon. Alkaline metals can advantageously be selected as the metallic reductant, e.g. sodium. The reduction step employing an alkaline metal such as sodium can lead to elemental silicon and release sodium fluoride (NaF), the latter being advantageously recycled in a multistep process regenerating Na and HF. Said regenerated Na can advantageously be reused as reductant in the step 3(b) mentioned here leading to an equilibrated material balance. Said regenerated HF can advantageously be reused, for example in the step 2(a) of the process leading to an equilibrated material balance.

Step 3(c)—Reduction of SiO by Hydrogen Gas

In an embodiment according to the present invention, there is provided a method for the reduction of SiO by hydrogen gas for the production of elemental silicon. A part of the produced elemental silicon can advantageously be reinjected in the step 2(b) in order to avoid any input of elemental silicon in the process, the other part (in "excess") of the produced elemental silicon being directly consumed in the next hydrohalogenation step 4 of the process.

Step 4—Hydrohalogenation of the Elemental Silicon

In an embodiment according to the present invention, there is provided a method for the hydrohalogenation of the elemental silicon for the production of halosilanes, e.g. monohalosilane ($H_3SiX$), dihalosilane ($H_2SiX_2$), trihalosilane ($HSiX_3$) and/or tetrahalosilane ($SiX_4$), or a mixture of these compounds (X being a halide). Elemental silicon used in the hydrohalogenation step is preferably originating from the previous step of the process. Hydrogen chloride (HCl) is a preferred hydrogen halide source for the said hydrohalogenation of the elemental silicon into dichlorosilane ($H_2SiCl_2$) and/or trichlorosilane ($HSiCl_3$) and/or tetrachlorosilane ($SiCl_4$); said hydrogen chloride can advantageously be an aqueous solution or a gas. In the case where hydrogen chloride is used, a process can be designed in order to redistribute $HSiCl_3$, which is the main product of the silicon hydrochlorination reaction, through a catalysed dismutation reaction into a mixture of $H_3SiCl$, $H_2SiCl_2$, $HSiCl_3$ and $SiCl_4$. $SiCl_4$ can advantageously be recycled via reduction by hydrogen gas in the presence of elemental silicon into a mixture of $H_2SiCl_2$, $HSiCl_3$ and $SiCl_4$. Elemental silicon used in the $SiCl_4$ reduction step is preferably originating from the previous step of the process. Hydrogen gas used in the $SiCl_4$ reduction step can advantageously be a by-product of another step of the process, for e.g. from the elemental silicon hydrohalogenation step mentioned above. Several subsequent separation and purification steps may allow to isolate pure $H_2SiCl_2$ which can be directly consumed in the next step (5) of the process.

Step 5—Controlled Hydrolysis of Halosilanes

In an embodiment according to the present invention, there is provided a method for the controlled hydrolysis of halosilanes by water to produce/regenerate the siloxane hydrogen carrier compounds. In the case where $H_2SiCl_2$ is used as halosilane source for the said controlled hydrolysis, HCl is formed as by-product. The formed HCl can advantageously be reinjected in the step 4 of the process. In the case where $H_2SiF_2$ is used as halosilane source for the said controlled hydrolysis, HF is formed as by-product. The formed HF can advantageously e reinjected in the step 2(a) of the process. Said hydrolysis can advantageously be performed in the presence of a chain terminating agent, preferably a carbon-free chain terminating agent, e.g. $H_3SiCl$, . . . etc. Final treating steps can advantageously be performed such as washings with water, containing or not a mineral base, gas stripping, drying steps etc. . . .

In an embodiment according to the present invention, the energy consumption required by the overall siloxane hydrogen carrier of formula (I) production process may be comprised between 1 and 200 kWh/kg of produced siloxane, for example between 1 and 35 kWh/kg of produced siloxane.

In an embodiment according to the present invention, the energy consumption required by the overall siloxane hydrogen carrier of formula (I) regeneration process may be comprised between 1 and 2000 kWh/kg of liberated $H_2$, for example between 1 and 400 kWh/kg of liberated $H_2$.

In an embodiment according to the present invention, the energy consumption required by the step 2(a) of the siloxane hydrogen carrier of formula (I) production/regeneration process may be comprised between 1 and 50 kWh/kg of produced $SiF_4$.

In an embodiment according to the present invention, the temperature of the method for the production of $SiF_4$ in the step 2(a) of the siloxane hydrogen carrier of formula (I) production/regeneration process may vary in a wide range, and may range notably from 0 to 1000° C.

In an embodiment according to the present invention, the pressure of the method for the production of $SiF_4$ in the step 2(a) of the siloxane hydrogen carrier of formula (I) production/regeneration process may vary in a wide range, and may range notably from 1 to $1·10^7$ Pa.

In an embodiment according to the present invention, the step 2(a) of the siloxane hydrogen carrier of formula (I) production/regeneration process is characterised in that the mixture of the hydrogen fluoride (HF)/silicate compound (B) molar ratio is superior or equal to 1. In an embodiment of the present invention, the said mixture of the HF and silicate compound (B) is characterised by a HF/(B) molar ratio which is comprised between 4 and 100.

In an embodiment according to the present invention, the number of unitary operations (e.g. reaction, separation, purification, etc. . . . ) required by the step 2(a) of the siloxane hydrogen carrier of formula (I) production/regeneration process may be comprised between 1 and 10.

In an embodiment according to the present invention, the energy consumption required by the step 2(b) of the siloxane hydrogen carrier of formula (I) production/regeneration process may be comprised between 1 and 50 kWh/kg of produced SiO.

In an embodiment according to the present invention, the temperature of the method for the production of SiO in the step 2(b) of the siloxane hydrogen carrier of formula (I) production/regeneration process may vary in a wide range, and may range notably from 1000 to 2000° C.

In an embodiment according to the present invention, the pressure of the method for the production of SiO in the step 2(b) of the siloxane hydrogen carrier of formula (I) production/regeneration process may vary in a wide range, and may range notably from 1 to $1.10^7$ Pa. More preferably the pressure ranges from 100 to 10 000 Pa.

In an embodiment according to the present invention, the step 2(b) of the siloxane hydrogen carrier of formula (I) production process is characterised in that the mixture of the silicate compound (B)/Si molar ratio is superior or equal to 0.1. In an embodiment of the present invention, the said mixture of the silicate compound (B) and Si is characterised by a compound (B)/Si molar ratio which is comprised between 0.5 and 1.5. Preferably, the silicate compound (B)/Si molar ratio is 1.

In an embodiment according to the present invention, the number of unitary operations (e.g. reaction, separation, purification, etc. . . . ) required by the step 2(b) of the siloxane hydrogen carrier of formula (I) production/regeneration process may be comprised between 1 and 10.

In an embodiment according to the present invention, the energy consumption required by the step 2(c) of the siloxane hydrogen carrier of formula (I) production/regeneration process may be comprised between 1 and 50 kWh/kg of produced Si.

In an embodiment according to the present invention, the temperature of the method for the production of Si in the step 2(c) of the siloxane hydrogen carrier of formula (I) production/regeneration process may vary in a wide range, and may range notably from 30 to 6000° C.

In an embodiment according to the present invention, the pressure of the method for the production of Si in the step 2(c) of the siloxane hydrogen carrier of formula (I) production/regeneration process may vary in a wide range, and may range notably from 1 to $1.10^7$ Pa. More preferably the pressure ranges from 10 to 10 000 Pa.

In an embodiment according to the present invention, the step 2(c) of the siloxane hydrogen carrier of formula (I) production/regeneration process is characterised in that the mixture of the $H_2$ gas/silicate compound (B) molar ratio is superior or equal to 0.1. In an embodiment of the present invention, the said mixture of the $H_2$ gas and silicate compound (B) is characterised by a $H_2$ gas/compound (B) molar ratio which is comprised between 2 and 100. Preferably, between 2 and 20.

In an embodiment according to the present invention, the number of unitary operations (e.g. reaction, separation, purification, etc. . . . ) required by the step 2(c) of the siloxane hydrogen carrier of formula (I) production/regeneration process may be comprised between 1 and 10.

In an embodiment according to the present invention, the energy consumption required by the step 3(a) of the siloxane hydrogen carrier of formula (I) production/regeneration process may be comprised between 1 and 50 kWh/k of produced $H_2SiF_2$.

In an embodiment according to the present invention, the temperature of the method for the production of $H_2SiF_2$ in the step 3(a) of the siloxane hydrogen carrier of formula (I) production/regeneration process may vary in a wide range, and may range notably from 1000 to 2000° C.

In an embodiment according to the present invention, the pressure of the method for the production of $H_2SiF_2$ in the step 3(a) of the siloxane hydrogen carrier of formula (I) production/regeneration process may vary in a wide range, and may range notably from 1 to $1.10^7$ Pa.

In an embodiment according to the present invention, the step 3(a) of the siloxane hydrogen carrier of formula (I) production/regeneration process is characterised in that the mixture of the hydrogen gas ($H_2$)/$SiF_4$ molar ratio is superior or equal to 1. In an embodiment of the present invention, the said mixture of the $H_2$ and $SiF_4$ is characterised by a $H_2/SiF_4$ molar ratio which is comprised between 1 and 100.

In an embodiment according to the present invention, the number of unitary operations (e.g. reaction, separation, purification, etc. . . . ) required by the step 3(a) of the siloxane hydrogen carrier of formula (I) production/regeneration process may be comprised between 1 and 10.

In an embodiment according to the present invention, the energy consumption required by the step 3(a') of the siloxane hydrogen carrier of formula (I) production/regeneration process may be comprised between 1 and 50 kWh/kg of produced Si.

In an embodiment according to the present invention, the temperature of the method for the production of Si in the step 3(a') of the siloxane hydrogen carrier of formula (I) production/regeneration process may vary in a wide range, and may range notably from 30 to 6000° C.

In an embodiment according to the present invention, the pressure of the method for the production of Si in the step 3(a') of the siloxane hydrogen carrier of formula (I) production/regeneration process may vary in a wide range, and may range notably from 1 to $1.10^7$ Pa.

In an embodiment according to the present invention, the step 3(a') of the siloxane hydrogen carrier of formula (I) production/regeneration process is characterised in that the mixture of the hydrogen gas ($H_2$)/$SiF_4$ molar ratio is superior or equal to 2. In an embodiment of the present invention, the said mixture of the $H_2$ and $SiF_4$ is characterised by a $H_2/SiF_4$ molar ratio which is comprised between 2 and 100.

In an embodiment according to the present invention, the number of unitary operations (e.g. reaction, separation, purification, etc. . . . ) required by the step 3(a) of the siloxane hydrogen carrier of formula (I) production/regeneration process may be comprised between 1 and 10.

In an embodiment according to the present invention, the energy consumption required by the step 3(b) of the siloxane hydrogen carrier of formula (I) production/regeneration process may be comprised between 1 and 50 kWh/kg of produced Si.

In an embodiment according to the present invention, the temperature of the method for the production of Si in the step 3(b) of the siloxane hydrogen carrier of formula (I) production/regeneration process may vary in a wide range, and may range notably from 100 to 1000° C.

In an embodiment according to the present invention, the pressure of the method for the production of Si in the step 3(b) of the siloxane hydrogen carrier of formula (I) production/regeneration process may vary in a wide range, and may range notably from 1 to $1.10^7$ Pa.

In an embodiment according to the present invention, the step 3(b) of the siloxane hydrogen carrier of formula (I) production/regeneration process is characterised in that the mixture of sodium (Na)/$SiF_4$ molar ratio is superior or equal to 1. In an embodiment of the present invention, the said mixture of the Na and $SiF_4$ is characterised by a $Na/SiF_4$ molar ratio which is comprised between 4 and 100.

In an embodiment according to the present invention, the number of unitary operations (e.g. reaction, separation, purification, etc. . . . ) required by the step 3(b) of the siloxane hydrogen carrier of formula (I) production/regeneration process may be comprised between 1 and 10.

In an embodiment according to the present invention, the energy consumption required by the step 3(c) of the siloxane hydrogen carrier of formula (I) production/regeneration process may be comprised between 1 and 50 kWh/kg of produced Si.

In an embodiment according to the present invention, the temperature of the method for the production of Si in the step 3(c) of the siloxane hydrogen carrier of formula (I) production/regeneration process may vary in a wide range, and may range notably from 500 to 2000° C.

In an embodiment according to the present invention, the pressure of the method for the production of Si in the step 3(c) of the siloxane hydrogen carrier of formula (I) production/regeneration process may vary in a wide range, and may range notably from 1 to $1.10^7$ Pa.

In an embodiment according to the present invention, the step 3(c) of the siloxane hydrogen carrier of formula (I) production/regeneration process is characterised in that the mixture of hydrogen gas ($H_2$)/SiO molar ratio is superior or equal to 1. In an embodiment of the present invention, the said mixture of the $H_2$ and SiO is characterised by a $H_2$/SiO molar ratio which is comprised between 5 and 10. In an embodiment of the present invention, the said mixture of the $H_2$ and SiO is characterised by a $H_2$/SiO molar ratio which is 6.

In an embodiment according to the present invention, the number of unitary operations (e.g. reaction, separation, purification, etc. . . . ) required by the step 3(c) of the siloxane hydrogen carrier of formula (I) production/regeneration process may be comprised between 1 and 10.

In an embodiment according to the present invention, the energy consumption required by the step 4 of the siloxane hydrogen carrier of formula (I) production/regeneration process may be comprised between 1 and 50 kWh/kg of produced [$H_2SiCl_2$].

In an embodiment according to the present invention, the number of unitary operations (e.g. reaction, separation, purification, etc. . . . ) required by the step 4 of the siloxane hydrogen carrier of formula (I) production/regeneration process may be comprised between 1 and 20.

The controlled hydrolysis of halosilanes of step 5 according to the present invention can advantageously be illustrated by either Step 5(a) or Step 5(b) as depicted in FIG. 2.

In an embodiment according to the present invention, the energy consumption required by the step 5(a) of the siloxane hydrogen carrier of formula (I) production/regeneration process may be comprised between 1 and 50 kWh/kg of produced [$H_2SiO$].

In an embodiment according to the present invention, the temperature of the method for the production of [$H_2SiO$] in the step 5(a) of the siloxane hydrogen carrier of formula (I) production/regeneration process may vary in a wide range, and may range notably from −50 to 100° C.

In an embodiment according to the present invention, the pressure of the method for the production of [$H_2SiO$] in the step 5(a) of the siloxane hydrogen carrier of formula (I) production/regeneration process may vary in a wide range, and may range notably from 1 to $1.10^7$ Pa.

In an embodiment according to the present invention, the step 5(a) of the siloxane hydrogen carrier of formula (I) production/regeneration process is characterised in that the mixture of water ($H_2O$)/$H_2SiCl_2$ molar ratio is superior or equal to 0.1. In an embodiment of the present invention, the said mixture of the $H_2O$ and $H_2SiCl_2$ is characterised by a $H_2O$/$H_2SiCl_2$ molar ratio which is comprised between 0.1 and 10000.

In an embodiment according to the present invention, the number of unitary operations (e.g. reaction, separation, purification, etc. . . . ) required by the step 5(a) of the siloxane hydrogen carrier of formula (I) production/regeneration process may be comprised between 1 and 10.

In an embodiment according to the present invention, the energy consumption required by the step 5(b) of the siloxane hydrogen carrier of formula (I) production/regeneration process may be comprised between 1 and 50 kWh/kg of produced [$H_2SiO$].

In an embodiment according to the present invention, the temperature of the method for the production of [$H_2SiO$] in the step 5(b) of the siloxane hydrogen carrier of formula (I) production/regeneration process may vary in a wide range, and may range notably from −50 to 100° C.

In an embodiment according to the present invention, the pressure of the method for the production of [$H_2SiO$] in the step 5(b) of the siloxane hydrogen carrier of formula (I) production/regeneration process may vary in a wide range, and may range notably from 1 to $1.10^7$ Pa.

In an embodiment according to the present invention, the step 5(b) of the siloxane hydrogen carrier of formula (I) production/regeneration process is characterised in that the mixture of water ($H_2O$)/$H_2SiF_2$ molar ratio is superior or equal to 0.1. In an embodiment of the present invention, the said mixture of the $H_2O$ and $H_2SiF_2$ is characterised by a $H_2O$/$H_2SiF_2$ molar ratio which is comprised between 0.1 and 10000.

In an embodiment according to the present invention, the number of unitary operations (e.g. reaction, separation, purification, etc. . . . ) required by the step 5(b) of the siloxane hydrogen carrier of formula (I) production/regeneration process may be comprised between 1 and 10.

The following terms and expressions contained herein are defined as follows:
hydrogen carriers are either solid-state or liquid-state materials that contain hydrogen atoms, readily releasable as molecular dihydrogen (H2) when needed.

It should be obvious to those skilled in the art that the present invention enables embodiments under numerous other specific forms without leaving the field of application of the invention as claimed. Consequently, the present embodiments must be considered as illustrations, but may be modified in the defined field by the scope of the attached claims, and the invention must not be limited to the details given above.

EXAMPLES

Liquid PHS (poly(dihydrosiloxane)) was prepared by controlled hydrolysis of dichlorosilane ($H_2SiC_2$) and obtained as a colorless liquid. Solid PHS was prepared by controlled hydrolysis of dichlorosilane ($H_2SiCl_2$) in the presence of trimethylsilyl chloride ($Me_3Si$—Cl) as chain terminating agent and obtained as colorless crystals. PHMS (poly(hydromethylsiloxane)) was obtained as a colorless liquid from commercial sources.

Figure 6:
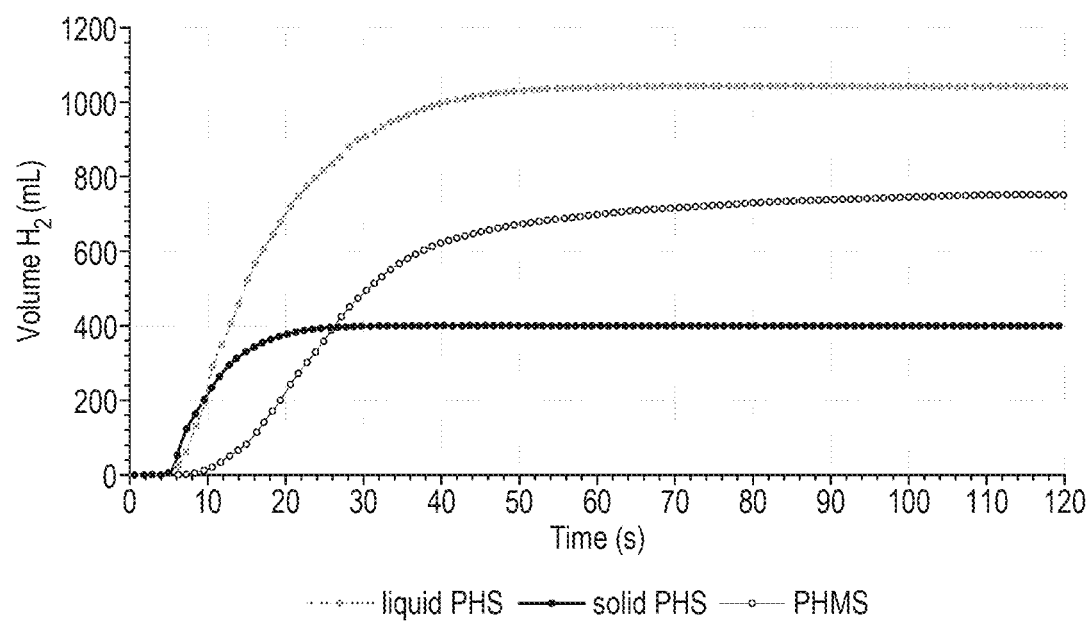
FIG. 6 illustrates a graph of examples of hydrogen release experiments.

FIG. 6 depicts hydrogen release experiments, with recording of the liberated volume of hydrogen gas over time, from three different siloxane hydrogen carriers. The following table summarizes the results.

| Example | Hydrogen carrier | Release time (s) | Volume H$_2$ released (mL) |
| --- | --- | --- | --- |
| 1 | PHMS | 20 | 400 |
| 2 | Linear solid PHS | 95 | 750 |
| 3 | Cyclic liquid PHS | 50 | 1040 |

All three reactions exhibit a quantitative yield. As a consequence of the chemical structure of each compound, the liquid poly(dihydrosiloxane) bearing a cyclic structure exhibits by far the highest volume of liberated hydrogen gas. Solid poly(dihydrosiloxane) presenting a linear structure demonstrates lower performances due to its carbon containing —SiMe$_3$ chain terminations lowering its hydrogen weight gravimetric efficiency. PHMS shows more than a two-fold lower performance when compared to liquid PHS since it carries only one hydride per hydromethylsiloxane repeating unit.

Description of the Experimental Set-Up

A 60 mL PET preform was connected (by screwing) to a pressure tight ball lock coupler featuring an outlet nozzle for hydrogen gas evacuation and a female thread to which a stainless needle, equipped with a stainless stopcock, was crimped for reactants injection.

The hydrogen gas outlet nozzle was connected to a flowmeter in order to monitor the kinetic of the hydrogen release. The hydrogen gas was collected in an inverted 2 L graduated measuring cylinder filled with water used as an additional volume measuring device. The flow of hydrogen gas released into the measuring cylinder was controlled by a needle valve.

Example 1

In a 60 mL PET preform was charged 1.007 g (16.75 mmol, 1.0 equiv.) of poly(hydromethylsiloxane) and 2 mL of NaOH (20 wt % in water) (12.2 mmol, 0.73 equiv.) was quickly added with a 5 mL syringe via the injection needle onto the reacting medium under vigorous stirring. The stopcock was closed and 400 mL (>99% yield) of hydrogen gas were collected in the measuring cylinder over a period of 20 seconds.

Example 2

In a 60 mL PET preform was charged 1.003 g (21.75 mmol, 1.0 equiv.) of linear solid poly(dihydrosiloxane) and 5 mL of NaOH (20 wt % in water) (30.5 mmol, 1.40 equiv.) was quickly added with a 5 mL syringe via the injection needle onto the reacting medium under vigorous stirring. The stopcock was closed and 750 mL (>99% yield) of hydrogen gas were collected in the measuring cylinder over a period of 95 seconds.

Example 3

In a 60 mL PET preform was charged 1.005 g (21.80 mmol, 1.0 equiv.) of cyclic liquid poly(dihydrosiloxane) and 5 mL of NaOH (20 wt % in water) (30.5 mmol, 1.40 equiv.) was quickly added with a 5 mL syringe via the injection needle onto the reacting medium under vigorous stirring. The stopcock was closed and 1040 mL (>99% yield) of hydrogen gas were collected in the measuring cylinder over a period of 50 seconds.

What is claimed is:

1. A process for the production of a liquid siloxane hydrogen carrier compound from reaction routes X or Y comprising the following steps:
   providing silica compound and/or silicate compound and for reaction route X,
      subjecting the silica compound and/or silicate compound to a halogenation step to produce silicon tetrahalide,
      subjecting the silicon tetrahalide to a reduction step to produce halosilane, and
      subjecting the halosilane to a hydrolysis step to produce a liquid siloxane hydrogen carrier compound; or
   for reaction route Y,
      subjecting the silica compound and/or silicate compound to a reduction step in presence of hydrogen to produce silicon,
      subjecting silicon to a hydrohalogenation step to produce halosilane, and
      subjecting the halosilane to a hydrolysis step to produce a liquid siloxane hydrogen carrier compound.

2. The process for the production of a liquid siloxane hydrogen carrier compound according to claim 1 without requiring carbon containing reactant and/or without carbon emissions when the siloxane hydrogen carrier compound is carbon free and/or with carbon emissions lower than 0.924 kg of CO$_2$ per kg of produced siloxane hydrogen carrier compound when the siloxane hydrogen carrier compound contains carbon.

3. The process for the production of a liquid siloxane hydrogen carrier compound according to claim 1 wherein the carbon emissions are lower than 0.462 kg of CO$_2$ per kg of produced siloxane hydrogen carrier compound when the siloxane hydrogen carrier compounds contain carbon.

4. The process for the production of a liquid siloxane hydrogen carrier compound according to claim 1 wherein the siloxane hydrogen carrier compound does not contain carbon.

5. The process for the production of a liquid siloxane hydrogen carrier compound according to claim 1 wherein process reactants don't contain carbon.

6. The process for the production of a liquid siloxane hydrogen carrier compound according to claim 1 wherein hydrogen halide is used for the halogenation of the silica and/or silicate compound of reaction route X to produce silicon tetrahalide.

7. The process for the production of a liquid siloxane hydrogen carrier compound according to claim 1 wherein hydrogen halide is used for the halogenation of the silica and/or silicate compound of reaction route X to produce silicon tetrahalide and wherein the hydrogen halide is hydrogen fluoride and the silicon tetrahalide is silicon tetrafluoride.

8. The process for the production of a liquid siloxane hydrogen carrier compound according to claim 1 wherein the reduction of the silica compound and/or silicate compound of reaction route Y is
   a one-step reduction in the presence of hydrogen to produce silicon; or
   a two-step reduction comprising the reduction of the silica compound and/or silicate compound in the presence of silicon to produce SiO and the reduction of the SiO in the presence of hydrogen to produce silicon.

9. The process for the production of a liquid siloxane hydrogen carrier compound according to claim 8 wherein the reduction of the silica compound and/or silicate compound of reaction route Y is the one-step reduction in the presence of hydrogen to produce silicon which is performed in a plasma without carbon emissions.

10. The process for the production of a liquid siloxane hydrogen carrier compound according to claim 1 wherein hydrogen is used for the reduction of the silicon tetrahalide of reaction route X to produce halosilane.

11. The process for the production of a liquid siloxane hydrogen carrier compound according to claim 10 wherein the silicon tetrahalide is silicon tetrafluoride and the halosilane is difluorosilane ($H_2SiF_2$).

12. The process for the production of a liquid siloxane hydrogen carrier compound according to claim 1 wherein hydrogen halide is used for the hydrohalogenation of silicon of reaction route Y to produce halosilane.

13. The process for the production of a liquid siloxane hydrogen carrier compound according to claim 12 wherein the hydrogen halide is hydrogen chloride and the halosilane is dichlorosilane ($H_2SiCl_2$).

14. The process for the production of a liquid siloxane hydrogen carrier compound according to claim 1 wherein water is used for the hydrolysis of the halosilane of reaction routes X or Y to produce a liquid siloxane hydrogen carrier compound.

15. The process for the production of a liquid siloxane hydrogen carrier compound according to claim 1 wherein the liquid siloxane hydrogen carrier compound has one or more units of formula (I):

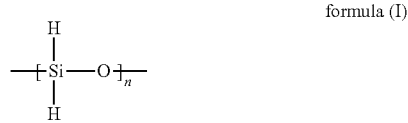

formula (I)

wherein n is an integer which is superior or equal to one.

16. The process for the production of a liquid siloxane hydrogen carrier compound according to claim 15 wherein the liquid siloxane hydrogen carrier compound is a linear compound of formula $ROH_{2n}Si_nO_nR'$ with n being an integer superior or equal to 1, R and R' are selected amongst Me, Et, Pr, $^iPr$, Bu, $^tBu$, Ph and/or $SiR''_3$ with R'' being selected amongst H, Me, Et, Pr, $^iPr$, Bu, $^tBu$ and/or Ph.

17. The process for the production of a liquid siloxane hydrogen carrier compound according to claim 16 wherein n is superior or equal to 2; and n is inferior or equal to 500.

18. The process for the production of a liquid siloxane hydrogen carrier compound according to claim 16 wherein R and R' don't contain carbon.

19. The process for the production of a liquid siloxane hydrogen carrier compound according to claim 18 wherein R and R' are $SiH_3$.

20. The process for the production of a liquid siloxane hydrogen carrier compound according to claim 15 wherein the liquid siloxane hydrogen carrier compound of formula (I) is a cyclic compound of formula $H_{2n}Si_nO_n$ with n being an integer superior or equal to 2.

21. The process for the production of a liquid siloxane hydrogen carrier compound according to claim 20 wherein n is inferior or equal to 500.

22. The process for the production of a liquid siloxane hydrogen carrier compound according to claim 17 wherein R and R' don't contain carbon.

23. The process for the production of a liquid siloxane hydrogen carrier compound according to claim 22 wherein R and R' are $SiH_3$.

* * * * *